Figure 3:
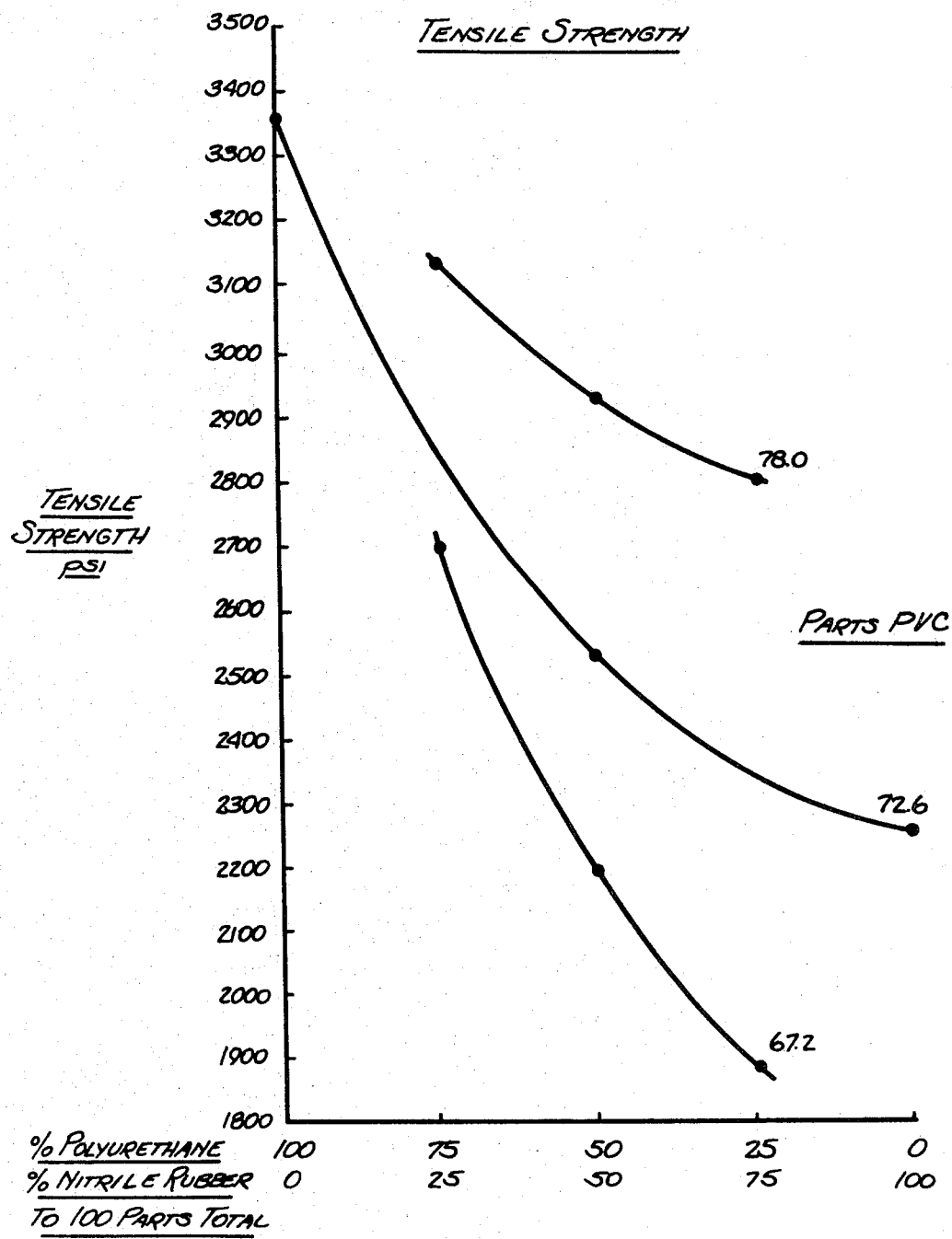

United States Patent  [15] 3,678,129
Fischer  [45] July 18, 1972

[54] THERMOPLASTIC POLYMER BLENDS CONTAINING POLYVINYL CHLORIDE, POLYETHER URETHANE AND BUTADIENE-ACRYLONITRILE COPOLYMERS

[72] Inventor: William K. Fischer, Woodbury, Conn.
[73] Assignee: Uniroyal, Inc., New York, N.Y.
[22] Filed: June 22, 1970
[21] Appl. No.: 48,163

[52] U.S. Cl. ............... 260/859 PV, 260/23 TN, 260/23 XA, 260/23.7 N, 260/23.7 H, 260/23.7 M, 260/31.8 M, 260/31.8 DR, 260/31.8 AN, 260/41 R, 260/41.5 R, 260/45.7 P, 260/45.75 K, 260/45.95, 260/77.5 CR, 260/859 R, 260/891
[51] Int. Cl. .......................................................... C08g 41/04
[58] Field of Search ..................... 260/859 PU, 859 PV

[56] References Cited

UNITED STATES PATENTS 2,956,903  10/1960  Spencer ............................... 260/859
3,283,031  11/1966  Greene ................................. 260/859

FOREIGN PATENTS OR APPLICATIONS 1,101,665  1/1968  Great Britain ...................... 260/859
1,293,378  4/1962  France ................................. 260/859
1,034,701  6/1966  Great Britain ...................... 260/859

Primary Examiner—Paul Lieberman
Attorney—Willard R. Sprowls

[57] ABSTRACT

Thermoplastic blends comprising a polyvinyl halide resin, a polyether polyurethane elastoplastic and an uncured diene-nitrile rubber in specified quantities and having specified properties have utility for various end used, those blends having excellent abrasion resistance being particularly suitable for use as shoe heel lift compositions.

12 Claims, 3 Drawing Figures

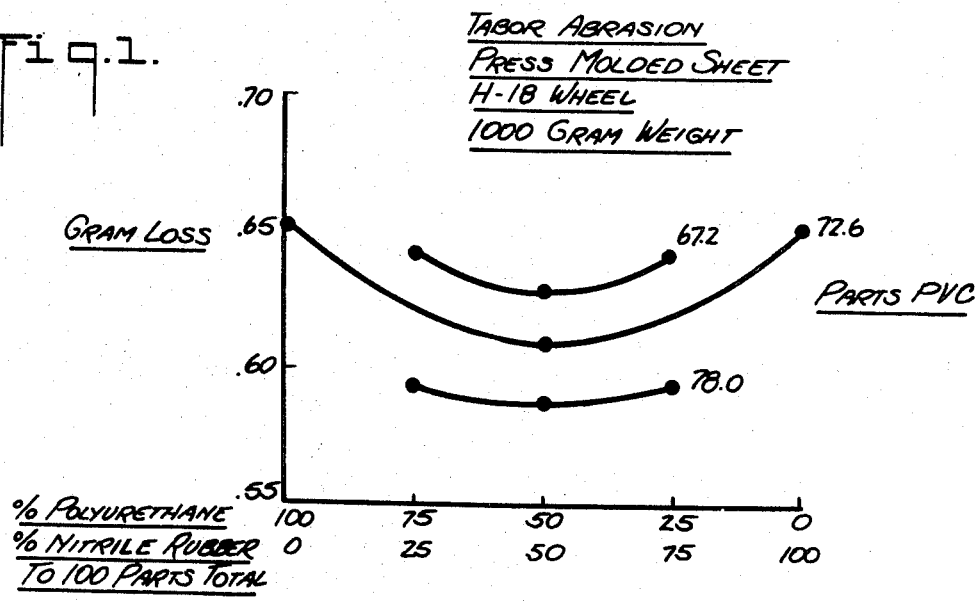
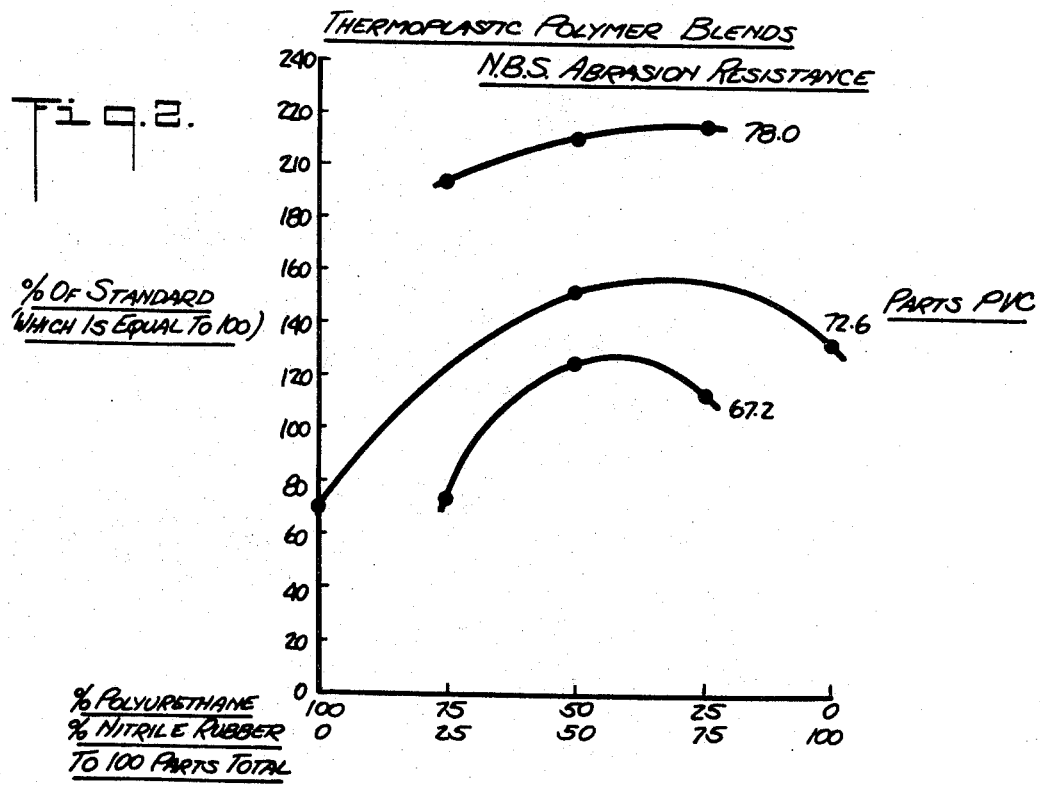

THERMOPLASTIC POLYMER BLENDS CONTAINING POLYVINYL CHLORIDE, POLYETHER URETHANE AND BUTADIENE-ACRYLONITRILE COPOLYMERS

This invention relates to thermoplastic compositions, some of which are characterized by high abrasion resistance, which comprise blends of a polyvinyl halide resin, a polyether polyurethane elastoplastic and an uncured aliphatic hydrocarbon diene-aliphatic nitrile rubbery copolymer. The quantities and properties of the several ingredients of the blends are set out below.

These thermoplastic compositions are useful in many applications as molded or extruded products such as pipes, sheets, phonograph records, paneling in automobiles or homes, luggage shells, typewriter casings and the like. The use of certain of these blends in shoe heel lifts is particularly valuable. The principal material used commercially at this time for shoe heel lifts is a silica-loaded butadiene-acrylonitrile rubber combined with a phenolic resin; this composition is not thermoplastic. The advantages of the shoe heel lift compositions of this invention over the prior art material containing the phenolic resin are superior abrasion resistance; they can be cement bonded by machine unlike the prior art material containing the phenolic resin; they can be nailed but do not require nailing; the scrap is reprocessable, since the compositions are thermoplastic; they are extrudable into sheets (the form in which such compositions are preferably supplied to the shoe heel lift manufacturers), no press molding or curing cycle being required for this operation. The optimum compositions of this invention are up to more than 1000 percent better in N.B.S. abrasion resistance (ASTM D-1630) than the commercially available, prior art phenolic resin-containing composition referred to above.

It is an object of this invention to provide new thermoplastic compositions of excellent physical properties. It is a further object of this invention to provide such compositions having an exceptionally high abrasion resistance. Other objects will appear from the description of the invention which follows.

FIG. 1 presents Tabor abrasion data for certain compositions, some of which are within the scope of this invention.

FIG. 2 presents N.B.S. abrasion data for the same range of compositions.

FIG. 3 presents tensile strength data for the same range of compositions.

There are three principal components in the thermoplastic compositions of this invention. The first is a polyvinyl halide resin, which is preferably polyvinyl chloride. Suitable polyvinyl halide resins are those having a specific viscosity of from 0.28 to 0.4, a preferred specific viscosity (ASTM D-1243) range being from about 0.28 to 0.33.

The second component of the compositions of this invention is an uncured aliphatic hydrocarbon diene-aliphatic nitrile rubbery copolymer, which is characterized by having a Mooney viscosity of from 47 to 70; a preferred Mooney viscosity range is from 54 to 67. Such copolymers are prepared from conjugated dienes such as 1,3-butadiene, 2-methyl-1,3-butadiene, 2,3-dimethyl-1,3-butadiene, 2-chloro-1,3-butadiene and the like with ethylenically unsaturated copolymerizable monomers containing nitrogen such as acrylonitrile, methacrylonitrile, chloroacrylonitrile or mixtures of dienes and comonomers of the indicated types. Usually the diene content of the copolymers ranges from about 95 to 55 percent by weight, but copolymers of a 60-80 percent diene content are preferred in the compositions of this invention.

The third principal ingredient of the compositions of this invention is a polyether polyurethane elastoplastic having a 350° F. melt flow index of from 0 to 100. Such elastoplastics are usually prepared by the reaction of a polyether type polyol and a lower molecular weight polyol chain extender with a polyisocyanate having a functionality of 2. Suitable polyether polyols include polyethylene glycol, polypropylene glycol, polytetramethylene ether glycol, or mixtures thereof. Suitable chain extenders include diethylene glycol, triethylene glycol, dipropylene glycol, tripropylene glycol, 1,3 or 1,4-butylene glycol, 1,5-amylene glycol or mixtures thereof. In order to form the polyurethane elastoplastics, such polyols are reacted with diisocyanates such as methylene bis (phenylisocyanate), 2,4-tolylene or 2,6-tolylene diisocyanates, cyclohexylene diisocyanate, 3,3'-dimethyl-4,4'-biphenylene diisocyanate, tetramethylene diisocyanate, m-xylylene-1,3-diisocyanate, 3,3'-dimethoxydiphenylmethane-4,4'-diisocyanate, or mixtures thereof.

The compositions of this invention desirably contain from 65 to 80 parts by weight of a polyvinyl halide resin, from 5 to 25 parts by weight of the uncured diene-nitrile rubbery copolymer, and from 5 to 25 parts by weight of the polyether polyurethane elastoplastic. Particularly suitable compositions for the shoe heel lift end use contain from 70 to 76 parts by weight of polyvinyl chloride, from 12 to 20 parts by weight of the uncured butadiene-acrylonitrile rubbery copolymer, and from 8 to 15 parts by weight of a polyether polyurethane elastoplastic. It should be mentioned that the parts by weight specified for the polyvinyl halide resin do not include any other ingredients, while the parts by weight specified for the nitrile rubber and the polyurethane are inclusive of up to about 5 weight percent of other materials, such as stabilizers, processing aids, fillers and other normally added ingredients of this type.

In addition to these principal components, as indicated, the compositions of this invention may and normally would include other ingredients in minor amounts such as ozone, light and heat stabilizers, plasticizers, processing aids, fillers, coloring agents, and the like.

Preparation of the polyvinyl halide resins is presented in "Vinyl and Related Polymers", by Schildknecht (Wiley-1952). Details on the preparation of nitrile rubbers are available in "Synthetic Rubber", by Whitby (Wiley-1954), at pages 798–804. Thermoplastic polyurethane elastoplastics are also conventional materials; see, for example, "Polyurethane Technology", by Bruins (Interscience Publishers), at pages 198–200.

The blends of the invention may be prepared by the usual conventional means such as Banbury type internal mixers, rubber mills, extruders (especially the screw type) or, if preferred, the blending may be carried out in several steps employing each time a different mode of mixing. Also, the sequence or mode of addition may be varied. However, the preferred way of blending is to pre-blend the polyvinyl halide resin stock with most of the additives before charging the polyurethane elastoplastic and nitrile rubber thereto.

Such preferred way of blending can be effected in the following manner. A suitable pre-blend composition is:

| | Parts by Weight |
|---|---|
| Polyvinyl chloride (specific viscosity of 0.30) | 83.52 |
| Tin mercaptide stabilizer | 2.20 |
| Calcium stearate lubricant | 0.30 |
| Carbon black (e.g., Monarch 74) | 0.12 |
| Dioctylphthalate plasticizer | 13.40 |
| Nonylated phenol phosphite stabilizer | 0.38 |
| Stearic acid | 0.08 |

These ingredients were charged to a ribbon blender and mixed for two hours at 150° F. The resultant polyvinyl chloride pre-blend was transferred to a cooled Banbury type internal mixer, and the polyurethane elastoplastic and nitrile rubber were added in the quantities required to make up the compositions in the following Examples to a total of 100 parts by weight (1400 grams) of material. The Banbury mixer was operated at a No. 2 speed until the temperature of the blended mass had reached approximately 360° F. The time elapsed was about six minutes. The mass was removed from the Banbury mixer and smoothed on a two roll mill at 260° F. to a sheet thickness of 0.125 inch, such sheet then being stripped and diced at 77° F. The dice were charged to a screw type extruder. The screw compression ratio was 1.5/1.0, and the screw was operated at 20 RPM. The temperature of the die was maintained at 350°

F., that of the front barrel at 340° F., and that of the rear barrel at 270° F. The blend was extruded into sheets suitable for evaluation of extrudability and other physical properties; portions of the blends were press molded after milling by preheating for five minutes and pressing for five minutes at 350° F.

As an indication of a suitable nitrile rubber formulation for use in the compositions of this invention, the following represents the formulation for NBR-C in the tabulation presented below:

| | Parts by Weight |
|---|---|
| Butadiene (67%)-acrylonitrile (33%) rubber | 100 |
| Al salt of emulsifier, e.g., Dresinate 731 (disproportionated rosin acids) | 1.8 |
| Nonylated phenol phosphite stabilizer | 1.2 |

The polyurethane elastoplastic designated as PUE-A in the following tabulation is prepared by reacting a polyol blend comprising one equivalent of polytetramethylene ether glycol (1000 molecular weight) and two equivalents of 1,4-butanediol with methylene bis (phenylisocyanate), the equivalency ratio of isocyanate to hydroxyl groups being 1.0–1.1. The other polyurethane elastoplastic (PUE-B) is prepared by reacting one equivalent of polytetramethylene ether glycol (1000 molecular weight) and one equivalent of 1,4-butanediol with methylene bis (phenylisocyanate), the equivalency ratio of isocyanate to hydroxyl groups being 1.0–1.1. These elastoplastics are stabilized with up to 5 parts by weight of a hindered phenol type antioxidant, e.g., 2,2'-methylene bis(4-methyl-6-nonyl-phenol), and a U.V. absorber, e.g., 2-(2'-hydroxy-3',5'-di-t-butylphenyl)-5-chloro-1,2,3-benzotriazole (Tinuvin 327).

The following tabulation presents data on compositions within the scope of this invention, namely, Blends A through N, as well as, for comparative purposes, data on the prior art phenolic resin containing composition.

A through D, although having two to three times the N.B.S. abrasion resistance of the prior art composition, are low enough in abrasion resistance to be less than optimum for use as shoe heel lift compositions, but are satisfactory in the other end uses described above. Blends K through N are too hard and stiff for use as shoe heel lift compositions, but are also satisfactory for the other end uses referred to above.

In the case of the corresponding two component composition containing polyvinyl chloride and the polyurethane elastoplastic, the tear strength is unsatisfactory; the split tear strength (ASTM D-470) for this blend is 20 lbs./in., whereas the satisfactory tear strength for Blend F is 100 lbs./in. The nitrile rubber is compatible with the polyvinyl chloride preblend in a two component composition but there is an undesirable softening effect which is not noted in the compositions of this invention.

Electron photomicrographs of Blend E indicate that a three phase system exists wherein the nitrile rubber is not in true solution in the polyvinyl chloride phase and most, but not all, of the polyurethane is dispersed in the nitrile rubber.

FIG. 3, with its tensile strength data, confirms the presence of more than one phase in the compositions of this invention. The high tensile strengths observed as the polyurethane content increases indicate that the polyurethane is acting as an insoluble, incompatible filler, but is not present to the extent where a tensile strength reduction is to be expected.

It is considered that the combination of properties presented by the shoe heel lift compositions of this invention represent a synergistic effect, since it is entirely unexpected that a thermoplastic composition would be capable of developing such a high abrasion resistance. As noted, the use of nitrile rubber alone with a polyvinyl halide resin has a softening effect, and the compatibility of the polyurethane with a polyvinyl halide resin is unsatisfactory. Thus, there is no basis for predicting the outstanding utility of the compositions of this invention.

In this regard, reference may be made to FIGS. 1 and 2, especially the latter. It is to be noted that the high points on all

| | | A | B | C | D | E | F | G | H | I | J | K | L | M | N | Prior art [a] |
|---|---|---|---|---|---|---|---|---|---|---|---|---|---|---|---|---|
| 1 | PVC, parts by weight | 67.2 | 67.2 | 67.2 | 67.2 | 72.6 | 72.6 | 72.6 | 72.6 | 72.6 | 72.6 | 78.0 | 78.0 | 78.0 | 78.0 | |
| 2 | NBR-A, parts by weight | 7.9 | 16.4 | 24.9 | 21.6 | 13.7 | | | | | | 18.1 | 5.8 | 11.0 | 16.2 | 14.5 | |
| 3 | NBR-B, parts by weight | | | | | | | 13.7 | | 13.7 | | | | | | | |
| 4 | NBR-C, parts by weight | | | | | | 13.7 | | 13.7 | | | | | | | | |
| 5 | PUE-A, parts by weight | 24.9 | 16.4 | 7.9 | 11.2 | 13.7 | 13.7 | 13.7 | | | 9.3 | 16.2 | 11.0 | 5.8 | 7.5 | |
| 6 | PUE-B, parts by weight | | | | | | | | 13.7 | 13.7 | | | | | | | |
| 7 | Abrasion, NBS | 74 | 125 | 114 | 122 | 169 | 461 | 193 | 475 | 187 | 166 | 193 | 210 | 215 | 208 | 42 |
| 8 | Abrasion, Tabor, g | .6100 | .6550 | .6470 | | .5962 | .3887 | .6898 | .3691 | .4107 | | .5667 | .6057 | .6017 | | 1.071 |
| 9 | Notched Izod at 73° F., ft. lbs./in | .81 | 15.6 | 13.3 | | 20.8 | 22 | 16.6 | | | | 1.1 | 13.9 | 20.5 | | |
| 10 | Notched Izod at 0° F., ft. lbs./in | .44 | .51 | .48 | | .50 | .56 | 1.1 | | | | .42 | .39 | .44 | | |
| 11 | Tensile strength, p.s.i | 2,470 | 2,320 | 2,160 | 1,980 | 2,570 | 3,090 | 2,860 | 3,020 | 2,680 | 2,375 | 3,560 | 2,700 | 2,490 | 2,825 | |
| 12 | Elongation, percent | 70 | 320 | 410 | 370 | 300 | 240 | 210 | 220 | 210 | 330 | 120 | 280 | 330 | 290 | |
| 13 | Modulus, 100%, p.s.i | | 2,130 | 1,780 | 1,980 | 2,380 | 2,230 | 2,180 | 2,200 | 2,030 | 2,150 | 3,550 | 2,610 | 2,330 | 2,325 | |
| 14 | Brittle point, ° F | 32 | 20 | 4 | 11 | 20 | 22 | −31 | 10 | −26 | 27 | 32 | 30 | 41 | 36 | |

1=Polyvinyl chloride with specific viscosity of 0.30; used as pre-blend disclosed above, although weight given is that of PVC alone.
2=Butadiene (70%), acrylonitrile rubber with Mooney viscosity of 65 (ML-2 at 212° F.).
3=Butadiene (76%), acrylonitrile rubber with Mooney viscosity of 59.
4=Butadiene (67%), acrylonitrile rubber with Mooney viscosity of 55.
5=Polyether, methylene bis(phenylisocyanate)-based polyurethane elastoplastic with melt flow index in 0-100 range; Shore A hardness=90.
6=Polyether, methylene bis(phenylisocyanate)-based polyurethane elastoplastic with melt flow index in 0-100 range; Shore A hardness=82.
7=ASTM: D-1630; percent of standard (which is equal to 100).
8=ASTM: D-1044; weight loss (grams) after 3000 cycles.
9=ASTM: D-256.
10=ASTM: D-758.
11=ASTM: D-412.
12=ASTM: D-412.
13=ASTM: D-412.
14=ASTM: D-746.

[a] Phenolic resin containing composition.

It is to be noted that Blends F and H are optimum from the standpoint of end use as shoe heel lift compositions. They possess excellent abrasion resistance and a desirable combination of the other physical properties. Blend E, which has four times the N.B.S. laboratory test abrasion resistance of the prior art phenolic resin containing composition has been subjected to actual wear testing by manufacturers of shoe heel lifts, and it has been found to afford a 20–25 percent improvement under such testing conditions over the prior art composition. Blends of the FIG. 2 curves fall within the preferred composition range for this invention, the high points indicating the compositions with the highest abrasion resistances. Such compositions are those which also display a combination of optimum physical properties in other respects. FIGS. 1 and 2 thus clearly show the synergism represented by the preferred compositions of this invention.

Good results similar to those presented in the foregoing tabulation have been obtained for other blends within the scope of this invention. Such blends include those prepared from polyvinyl halide resins having a specific viscosity in the range from 0.28 to 0.4, these including other polyvinyl chlorides. It has been noted that, when the specific viscosity of this type of resin is lower than about 0.28, the abrasion resistance of the resulting three component composition is undesirably reduced. Similarly desirable results are achieved when other butadiene-acrylonitrile rubbers having Mooney viscosities in the range from about 47 to about 70, as well as nitrile rubbers in which the diene component is 2-methyl-1,3-butadiene, 2,3-dimethyl-1,3-butadiene or 2-chloro-1,3-butadiene and in which the nitrile component is methacrylonitrile or chloroacrylonitrile in the same viscosity range, are used in the three component compositions. It has been noted that, when the Mooney viscosity of the nitrile rubber is below about 47 or higher than about 70, the composition is nervy and the surface appearance of sheeted samples of the resulting compositions is undesirably rough. Likewise, similarly good results are achieved when polyether polyurethane elastoplastics having a melt flow index of from 0 to 100, other than the specific polyurethanes used in obtaining the data in the foregoing tabulation, are used in the three component compositions of this invention. Such polyurethanes have been prepared from the components listed above and have proven to provide satisfactory compositions for the end uses specified for the blends of this invention. It should be mentioned that the melt flow index is obtained using an apparatus based on ASTM D-1238, as modified by Mobay for use with polyurethanes. The apparatus differs from that specified by ASTM in that the orifice has a L/D ratio of 10/1 and the orifice diameter is 0.0625 inch, and the pressure on the melt is supplied pneumatically at a standard of 5000 psi. The temperature of the melt for the figures reported herein was 350° F. ASTM D-1703 also presents information on this test method. The range of 0 to 100, which is specified as being satisfactory for the polyurethane elastoplastics utilized in this invention, refers to the number of grams of polyurethane flowing through the orifice per 10 minutes.

Having thus described my invention, what I claim and desire to protect by Letters Patent is:

1. A shaped article comprising a blend of from 65 to 80 parts by weight of a polyvinyl halide resin having a specific viscosity of from 0.28 to 0.4; from 5 to 25 parts by weight of an uncured aliphatic hydrocarbon diene-aliphatic nitrile rubbery copolymer having a Mooney viscosity of from 47 to 70; and from 5 to 25 parts by weight of a polyether polyurethane elastoplastic having a 350° F. melt flow index of from 0 to 100; the weight ratio of said diene-nitrile copolymer to said polyurethane elastoplastic being in the range of from 1:3.2 to 3.2:1.

2. The shaped article of claim 1 in which said polyvinyl halide resin is polyvinyl chloride.

3. The shaped article of claim 1 in which said diene-nitrile copolymer is prepared from butadiene and acrylonitrile.

4. The shaped article of claim 1 in which said polyurethane elastoplastic is prepared from methylene bis(phenylisocyanate), polytetramethylene ether glycol and 1,4-butane diol.

5. A shaped article characterized by high abrasion resistance comprising a blend of from 70 to 76 parts by weight of polyvinyl chloride having a specific viscosity of from 0.28 to 0.33; from 12 to 20 parts by weight of an uncured butadiene-acrylonitrile rubbery copolymer having a Mooney viscosity of from 54 to 67; and from 8 to 15 parts by weight of a polyether polyurethane elastoplastic having a 350° F. melt flow index of from 0 to 100; the weight ratio of said diene-nitrile copolymer to said polyurethane elastoplastic being in the range of from 1:1 to 2:1.

6. A shoe heel lift characterized by high abrasion resistance comprising a blend of from 70 to 76 parts by weight of polyvinyl chloride having a specific viscosity of from 0.28 to 0.33; from 12 to 20 parts by weight of an uncured butadiene-acrylonitrile rubbery copolymer having a Mooney viscosity of from 54 to 67; and from 8 to 15 parts by weight of a polyether polyurethane elastoplastic having a 350° F. melt flow index of from 0 to 100; the weight ratio of said diene-nitrile copolymer to said polyurethane elastoplastic being in the range of from 1:1 to 2:1.

7. The process of making a shaped article which comprises the steps of blending from 65 to 80 parts by weight of a polyvinyl halide resin having a specific viscosity of from 0.28 to 0.4; from 5 to 25 parts by weight of an uncured aliphatic hydrocarbon diene-aliphatic nitrile rubbery copolymer having a Mooney viscosity of from 47 to 70; and from 5 to 25 parts by weight of a polyether polyurethane elastoplastic having a 350° F. melt flow index of from 0 to 100; the weight ratio of said diene-nitrile copolymer to said polyurethane elastoplastic being in the range of from 1:3.2 to 3.2:1; and forming the resulting blend into a shaped article.

8. The process of claim 7 in which said polyvinyl halide resin is polyvinyl chloride.

9. The process of claim 7 in which said dienenitrile copolymer is prepared from butadiene and acrylonitrile.

10. The process of claim 7 in which said polyurethane elastoplastic is prepared from methylene bis (phenylisocyanate), polytetramethylene ether glycol and 1,4-butane diol.

11. The process of making a shaped article characterized by high abrasion resistance which comprises the steps of blending from 70 to 76 parts by weight of polyvinyl chloride having a specific viscosity of from 0.28 to 0.33; from 12 to 20 parts by weight of an uncured butadiene-acrylonitrile rubbery copolymer having a Mooney viscosity of from 54 to 67; and from 8 to 15 parts by weight of a polyether polyurethane elastoplastic having a 350° F. melt flow index of from 0 to 100; the weight ratio of said diene-nitrile copolymer to said polyurethane elastoplastic being in the range of from 1:1 to 2:1; and forming the resulting blend into a shaped article.

12. The process of making a shoe heel lift characterized by high abrasion resistance which comprises the steps of blending from 70 to 76 parts by weight of polyvinyl chloride having a specific viscosity of from 0.28 to 0.33; from 12 to 20 parts by weight of an uncured butadiene-acrylonitrile rubbery copolymer having a Mooney viscosity of from 54 to 67; and from 8 to 15 parts by weight of a polyether polyurethane elastoplastic having a 350° F. melt flow index of from 0 to 100; the weight ratio of said diene-nitrile copolymer to said polyurethane elastoplastic being in the range of from 1:1 to 2:1; and forming the resulting blend into a shoe heel lift.

* * * * *